United States Patent [19]
Thor et al.

[11] Patent Number: 5,980,052
[45] Date of Patent: Nov. 9, 1999

[54] SUN REFLECTING DEVICE

[76] Inventors: Leifur Hayden Thor, 3095 Kerner Blvd. Suite M, San Rafael, Calif. 94901; Kenneth Tarlow, 21 Golden Hind Passage, Corte Madera, Calif. 94925

[21] Appl. No.: 08/902,521

[22] Filed: Jul. 29, 1997

[51] Int. Cl.[6] .................................................. G02B 7/182
[52] U.S. Cl. ..................... 359/877; 359/597; 359/865; 126/573; 250/203.4; 248/467
[58] Field of Search .................................. 359/843, 865, 359/872, 876, 877, 591, 597; 248/467, 479; 126/573, 578, 600, 608; 250/203.4

[56] References Cited

U.S. PATENT DOCUMENTS

| | | | |
|---|---|---|---|
| 1,434,075 | 10/1922 | Van Schooneveld | 359/597 |
| 4,063,543 | 12/1977 | Hedger | 126/579 |
| 4,791,533 | 12/1988 | Hane | 362/1 |
| 5,080,492 | 1/1992 | Platzer, Jr. | 359/877 |
| 5,313,337 | 5/1994 | Byers | 359/872 |
| 5,517,358 | 5/1996 | Dominguez | 359/592 |
| 5,600,124 | 2/1997 | Berger | 250/203.4 |

*Primary Examiner*—Cassandra Spyrou
*Assistant Examiner*—Mark A. Robinson

[57] ABSTRACT

A sun reflecting device capable of reflecting sunlight off of a mirror through a window and onto the ceiling of a room. The mirror holding assembly is adhered the outside of the window by suction cups or other mounting structure. The mirror is capable of changing angles by adjusting the height of a pair of lead screws which are attached to the underside of the mirror by universal joints and terminate on a support platform. A central post also supports the mirror and is attached by a universal joint. The lead screws are driven by stepper motors. A photosensor array is mounted to the inside of the window and an auxiliary mirror which is attached to the main mirror reflects sunlight on to the photosensor array. A microcontroller circuit responds to the photosensors' input and sends signals to the stepper motors so that the mirror is maintained in an ideal position to reflect sunlight to the chosen spot on the ceiling.

4 Claims, 14 Drawing Sheets

SUN REFLECTING DEVICE

FIELD OF THE INVENTION

The present invention relates to sun reflecting devices and more specifically to a self tracking sun reflecting device for augmenting natural light in a dwelling.

BACKGROUND OF THE INVENTION

Ever since man has lived in walled dwellings he has looked for ways to add light to the interior of the dwelling for purposes of seeing clearly while conducting activities indoors. To this end people have created windows made of clear glass or other clear materials to let in available light while keeping other natural elements out. If the available light is insufficient for carrying on normal indoor activities fire light, gas light and , more recently, electric light has been used to augment the day light that may be available from a window or windows. Electric light however consumes energy which must be paid for by the owner of the dwelling. Sky lights have been installed by some people to add light to a room however they are expensive to install and can not be installed by a renter such as an apartment dweller or by any person who lives on any but the top floor of a multi story building. More recently there have been proposals for "light pipes which transmit sun light to the interior of large office buildings which would normally be lit by electric light, however this form of light ducting tends to be expensive to install and is hard to retrofit into existing buildings. There remains a need therefore, for a means to bring additional sun light into a building or a room in a building so that the occupants of the building or room do not have to rely so heavily on electric lighting during day light hours.

OBJECTS AND SUMMARY OF THE PRESENT INVENTION

It is the object of the present invention to solve the above stated problem of adding additional sun light to a room in an economical way thereby reducing the need for expensive electric lighting. An additional object of the present invention is to provide a means of reflecting sun light through a window and onto the ceiling or wall of a room to augment the light present in the room. Another object of the present invention is to provide a sun light reflecting device which automatically tracks the sun so that the sun light being reflected into the room remains generally in one predetermined location during any hour of the day. Still a further object of the present invention is to provide a sun reflecting device which can be mounted to the outside of any window without the need to deface the window in any way. A further object of the present invention is to provide a sun reflecting device which can be set up and controlled by a controlling means located inside the room being lit. A further object of the present invention is to provide a sun reflecting means which when tracking has the ability to remember the tracking trajectory from hour to hour and day to day to help keep the device tracking even when a cloud temporarily obscures the sun light being reflected. Still a further objective of the present invention is to provide a sun light reflecting device which is economical to manufacture and which will stand up to the extremes of temperature, wind and humidity to which it will be subjected.

To this end the present invention is comprised of a main platform which has a pair essentially vertical X and Y arms capable of being raised and lowered in a controlled manner. A universal joint is attached to the top of each arm and the other end of each joint is attached to the underside of a mirrored surface such as an eighth inch thick acrylic plate. A third arm remains in a fixed position and also has a universal joint attached to the top of it. The central most portion of the underside of the mirrored surface is attached to the free end of the universal joint of the third arm. As the X and Y arms are raised and lowered the mirror pivots about the central third arm thereby causing any object reflected in the mirrored surface to appear to move in whatever direction the positioning arms dictate. The entire mirror assembly as described above is mounted to the outside of a window by means of horizontal extension arms and suction cups attached to the ends of the arms. A smaller mirror is located outboard of the main mirror and is capable of reflecting a spot of sunlight to a photodiode array mounted inside the window. As the sun moves the reflected spot of light moves along the photodiode array. A micro computer keeps track of the light movement and sends signals to the X and Y arms to adjust the mirror angle so that the main reflecting mirror remains positioned in a way which keeps the reflected sun light in a relatively constant location on a rooms ceiling or wall thereby bringing added sun light into a room. The same technology can be used for aiming sunlight at plants or other vegetation which requires more direct sunlight than the normal environment allows.

DETAILED DESCRIPTION OF THE PREFERRED EMBODIMENTS

Figure 1:
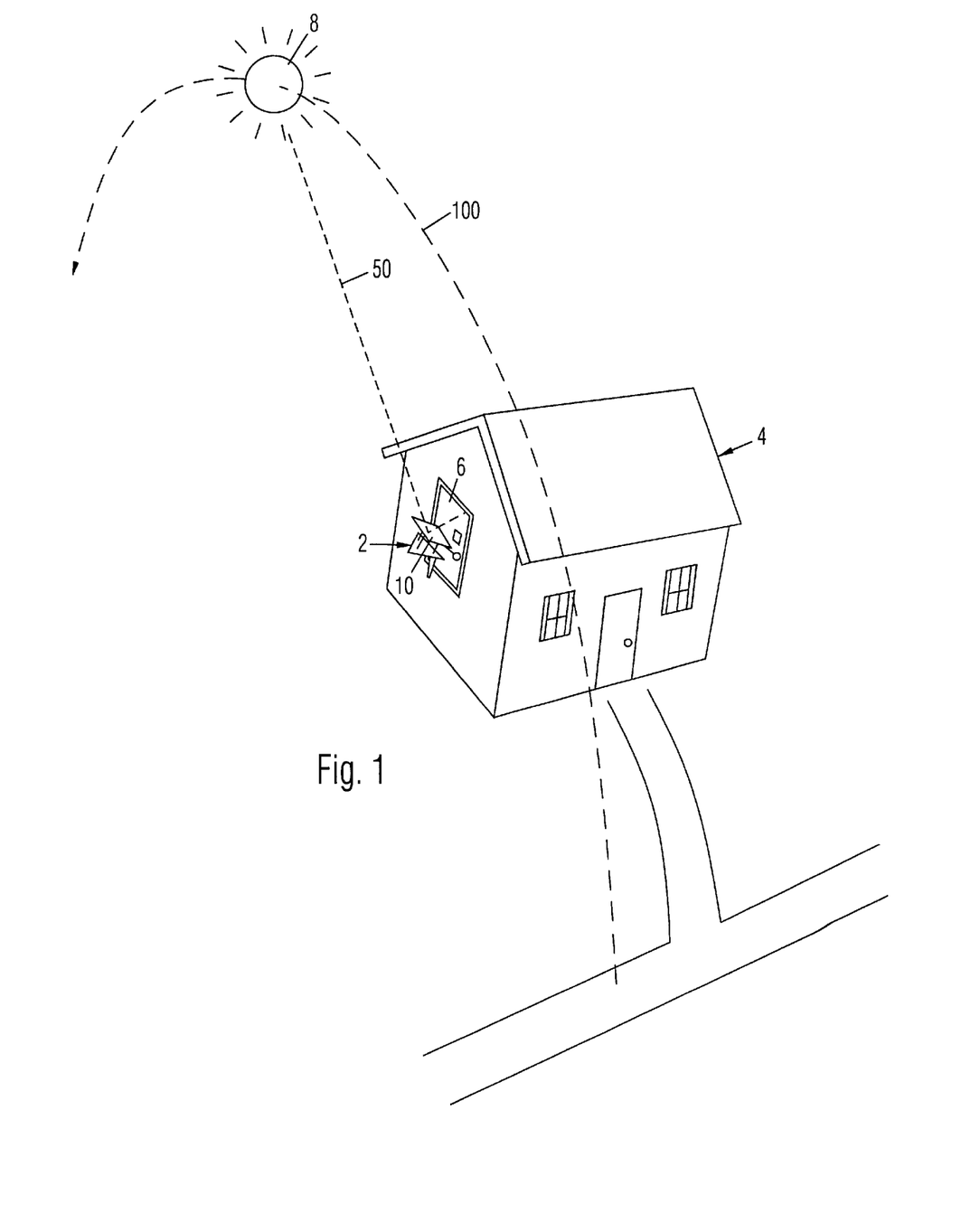
FIG. 1 is a perspective view of the sun reflecting device of the present invention mounted to a window of a house.
Figure 2:
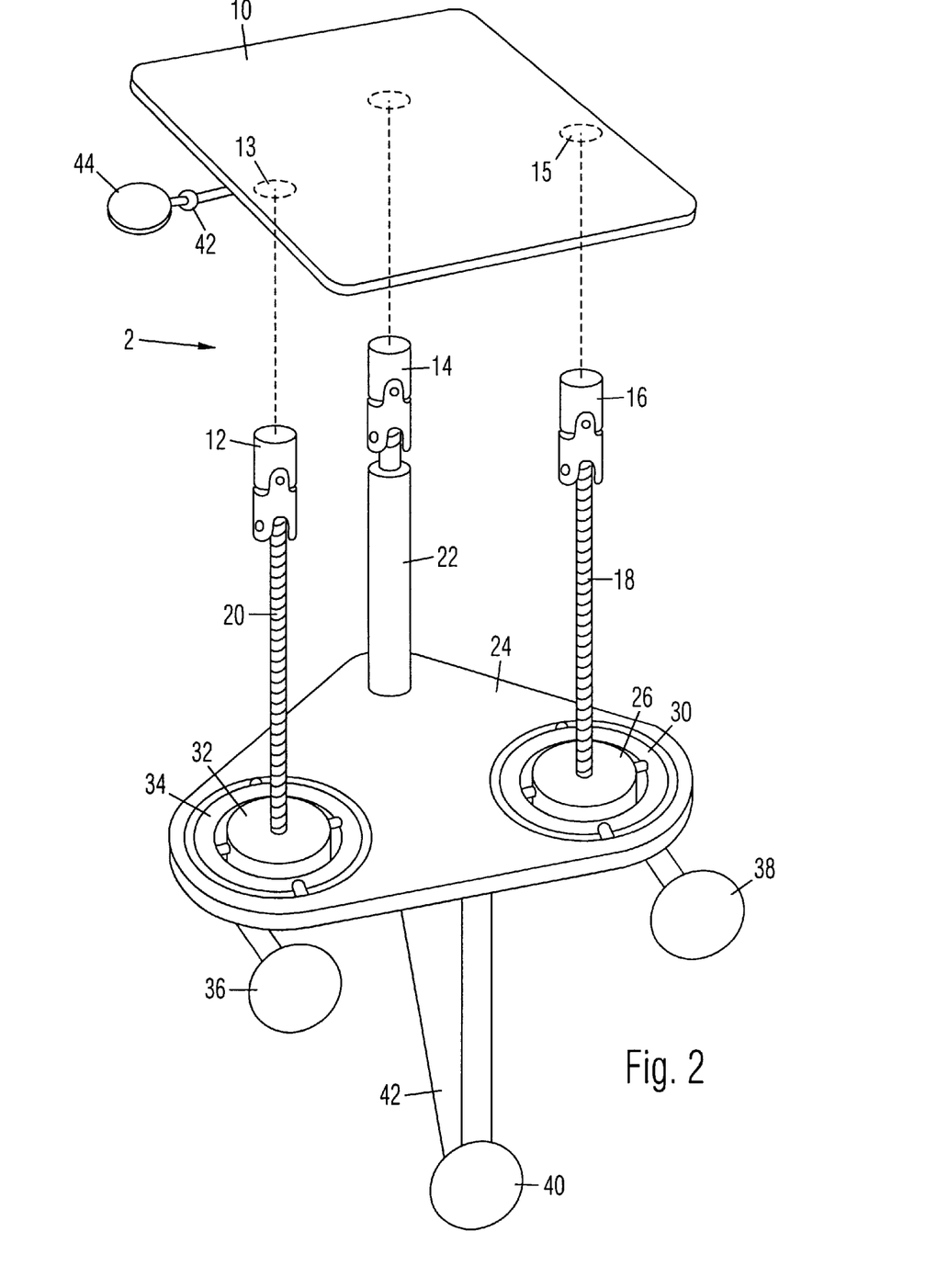
FIG. 2 is an exploded view of the tracking mechanism of the sun reflector of the present invention.
Figure 3:
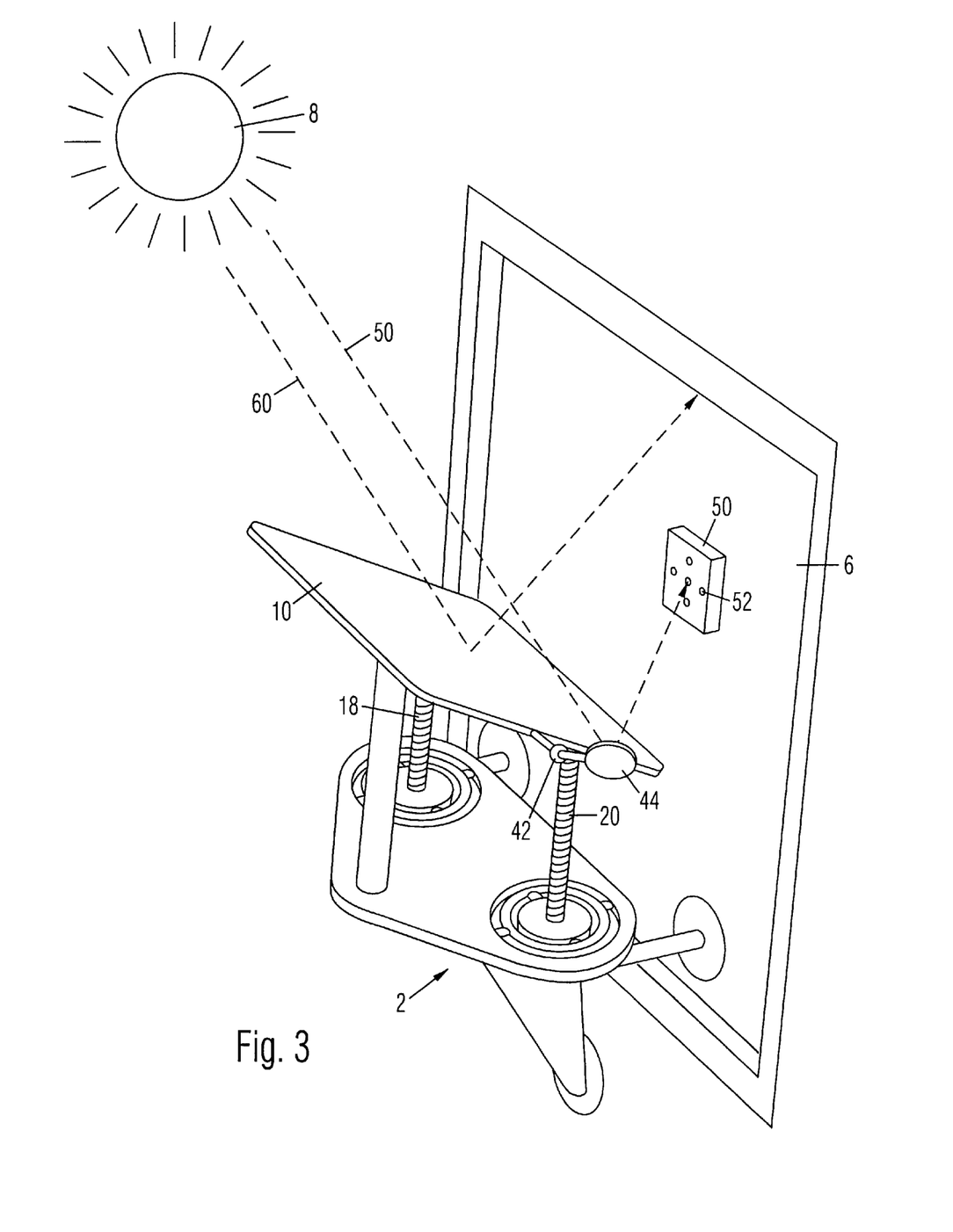
FIG. 3. is a perspective view of the present invention showing sunlight reflected on a photo sensor array.
Figure 4:
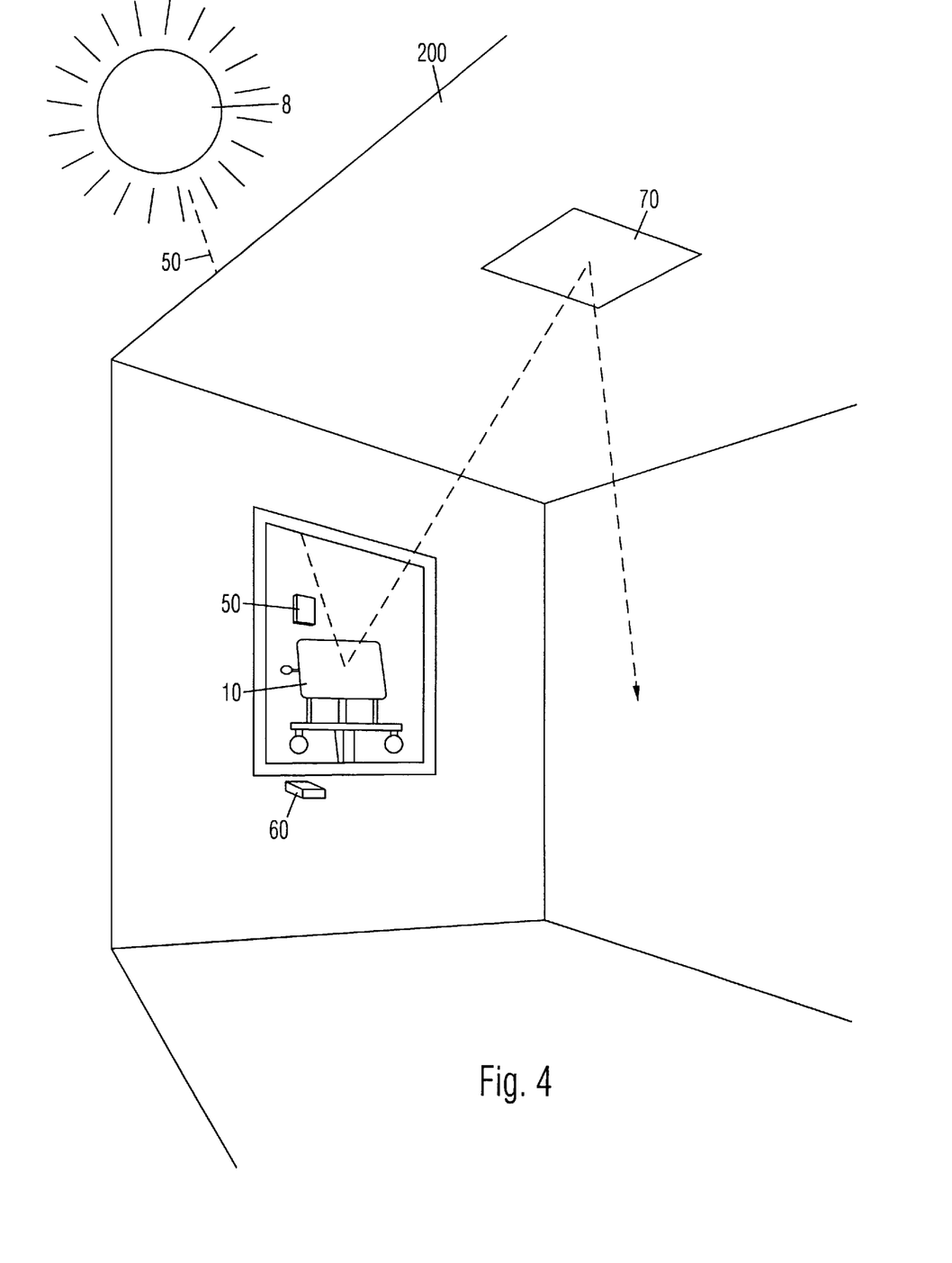
FIG. 4 is a perspective view of a room being lit by reflective sunlight emanating from the present invention.
Figure 5:
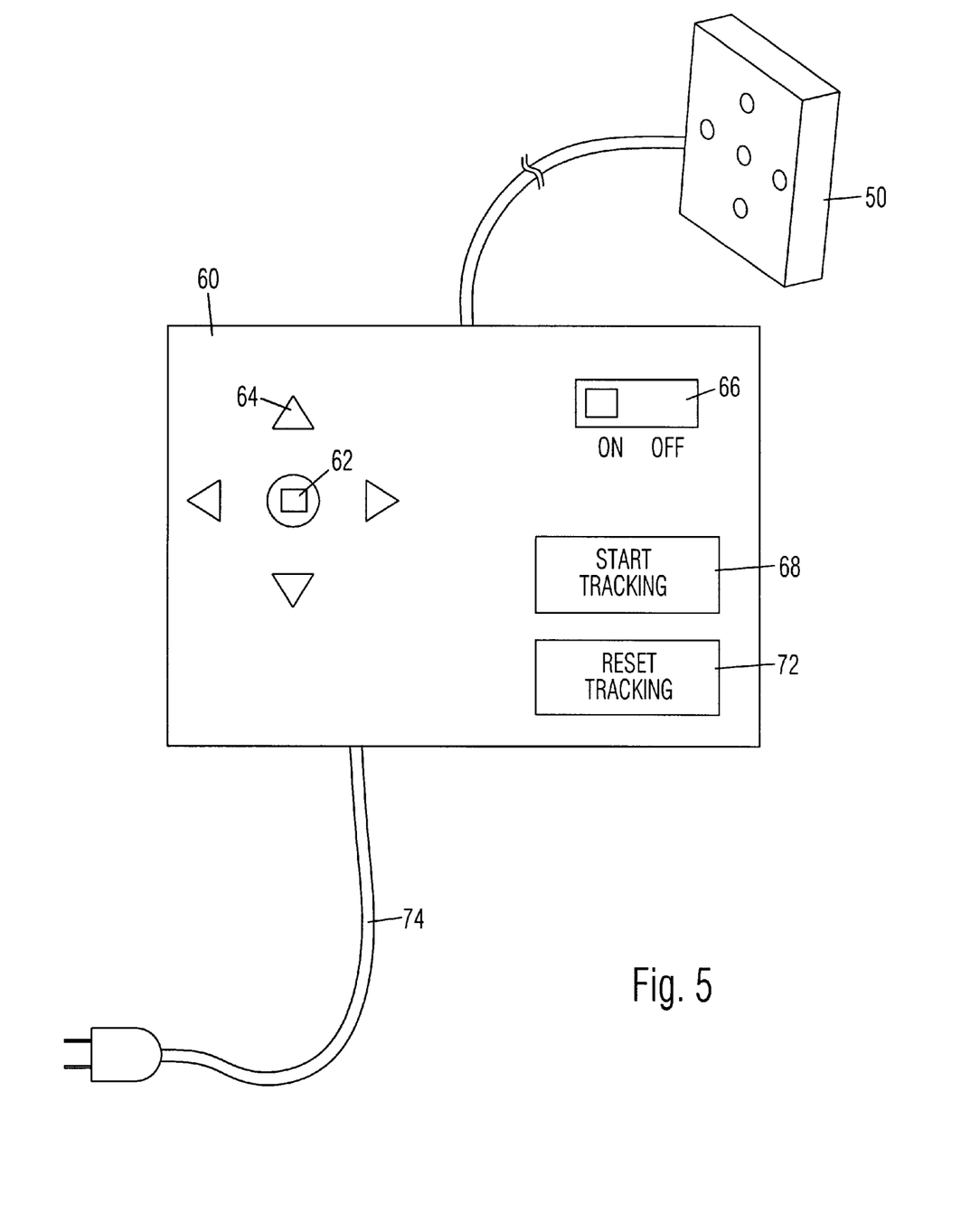
FIG. 5 is a plan view of the electronic tracking assembly.
Figure 6:
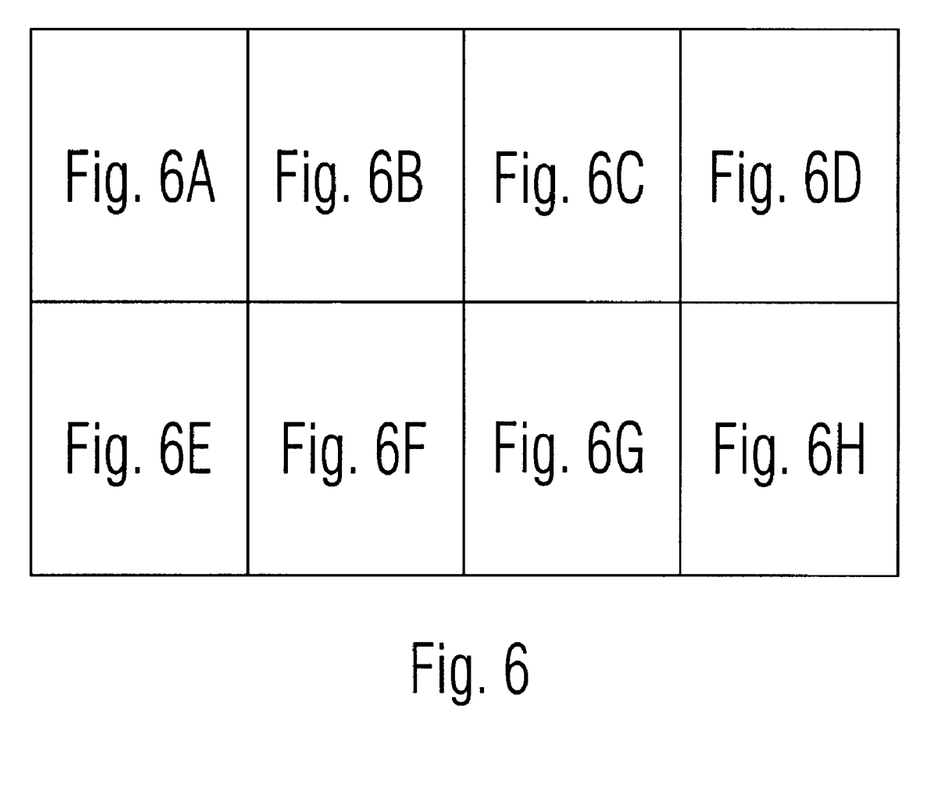
FIG. 6 is a schematic diagram of the microcomputer controlling circuitry which drives the tracking assembly of the present invention.
Figure 6A:
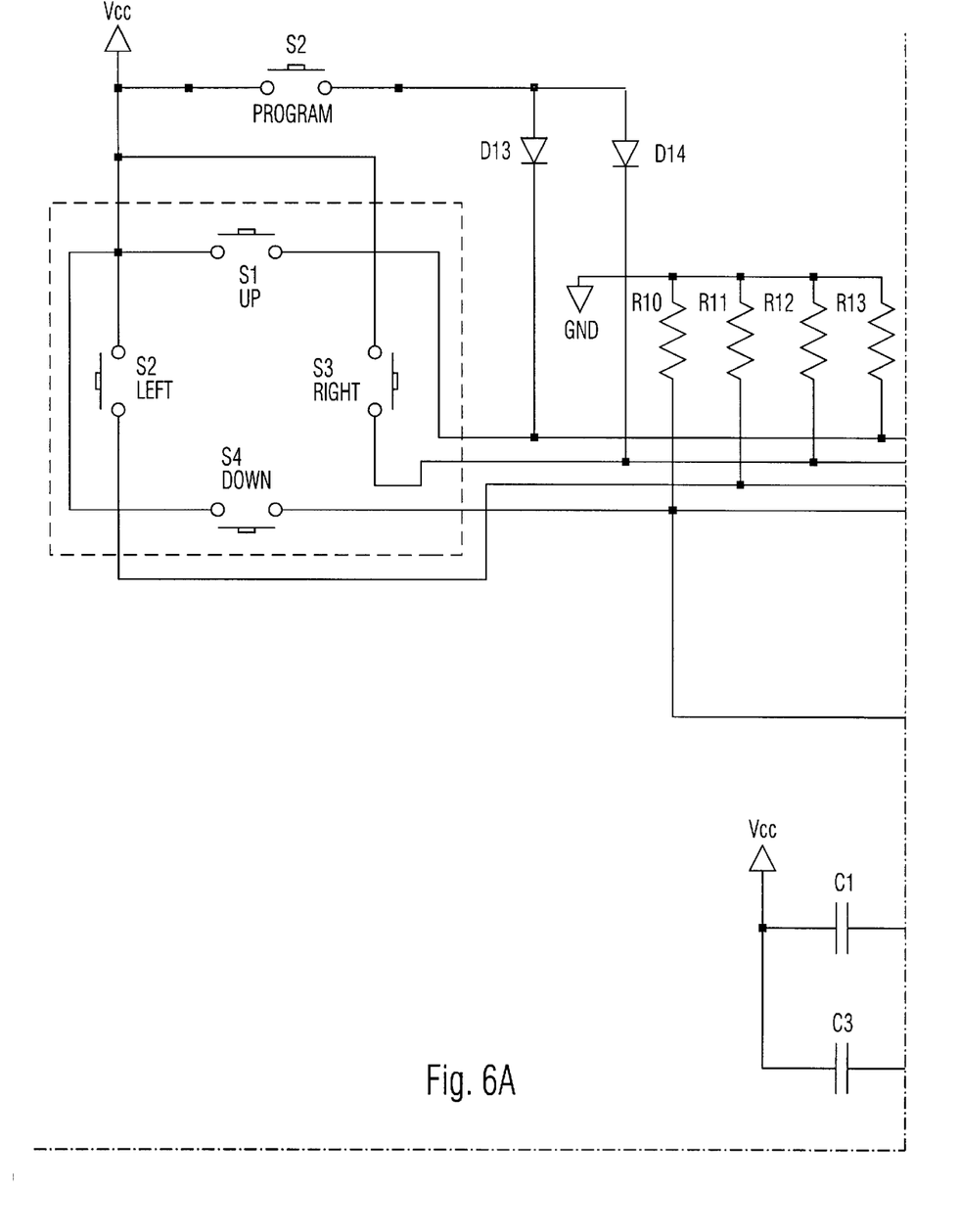
Figure 6B:
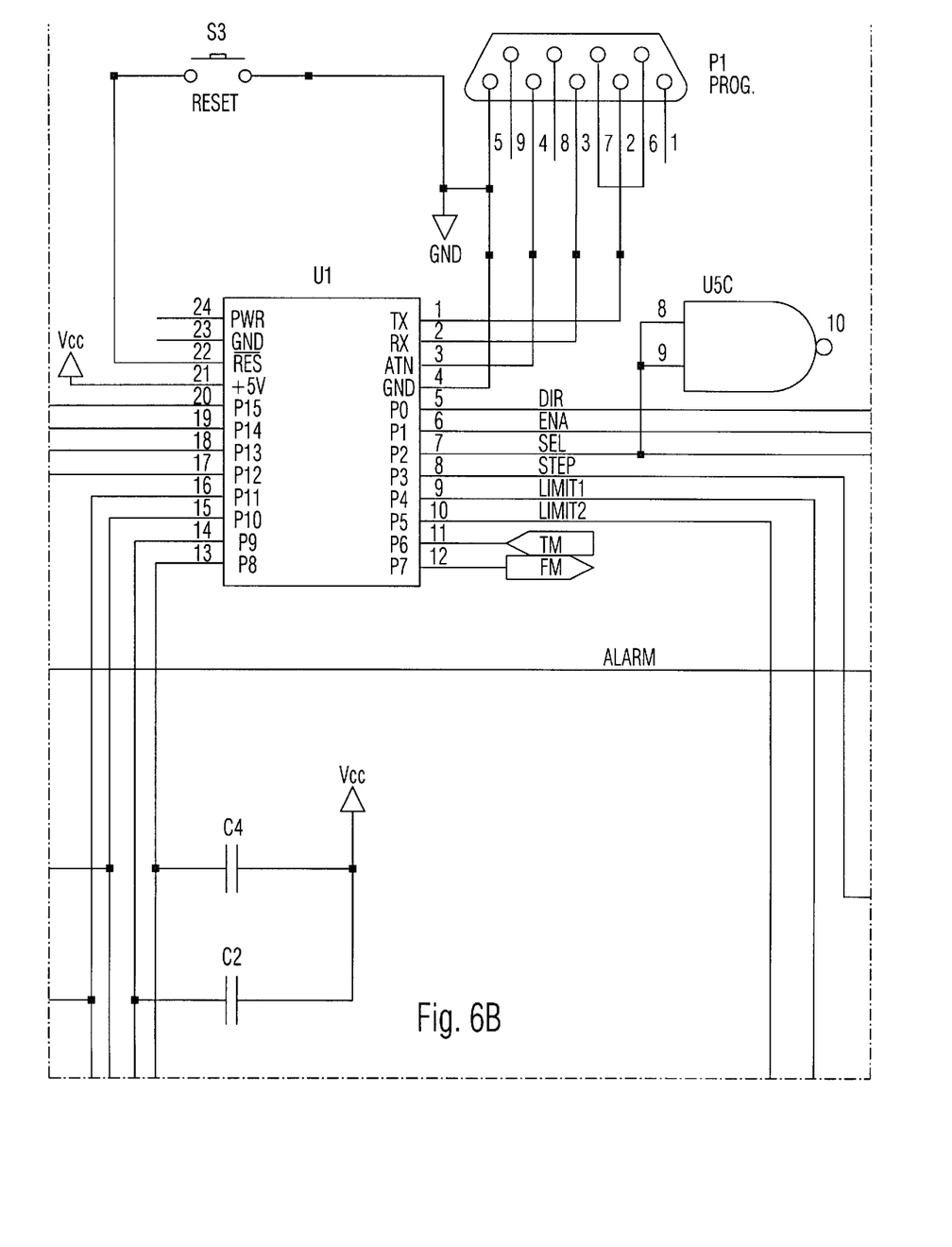
Figure 6C:
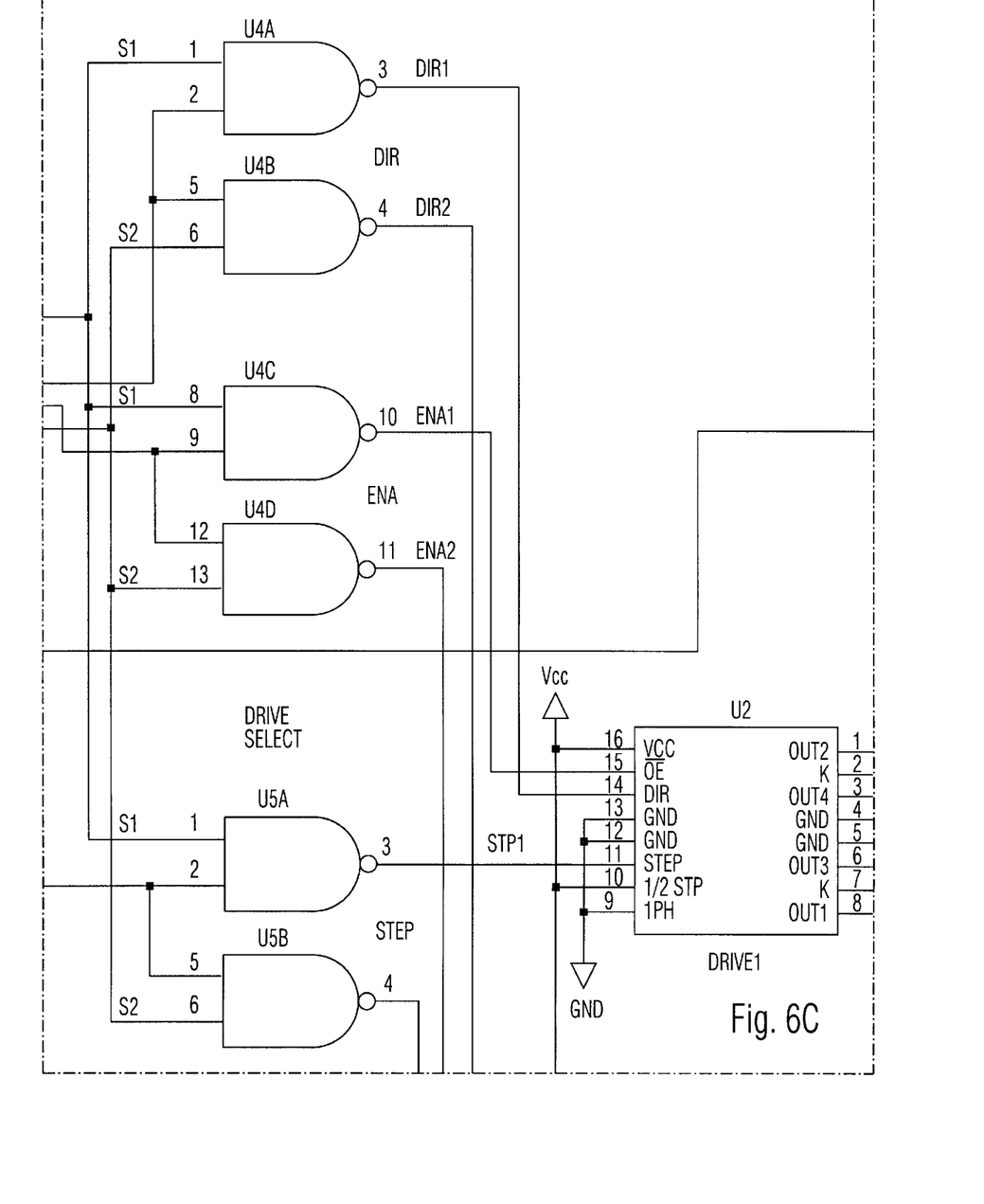
Figure 6D:
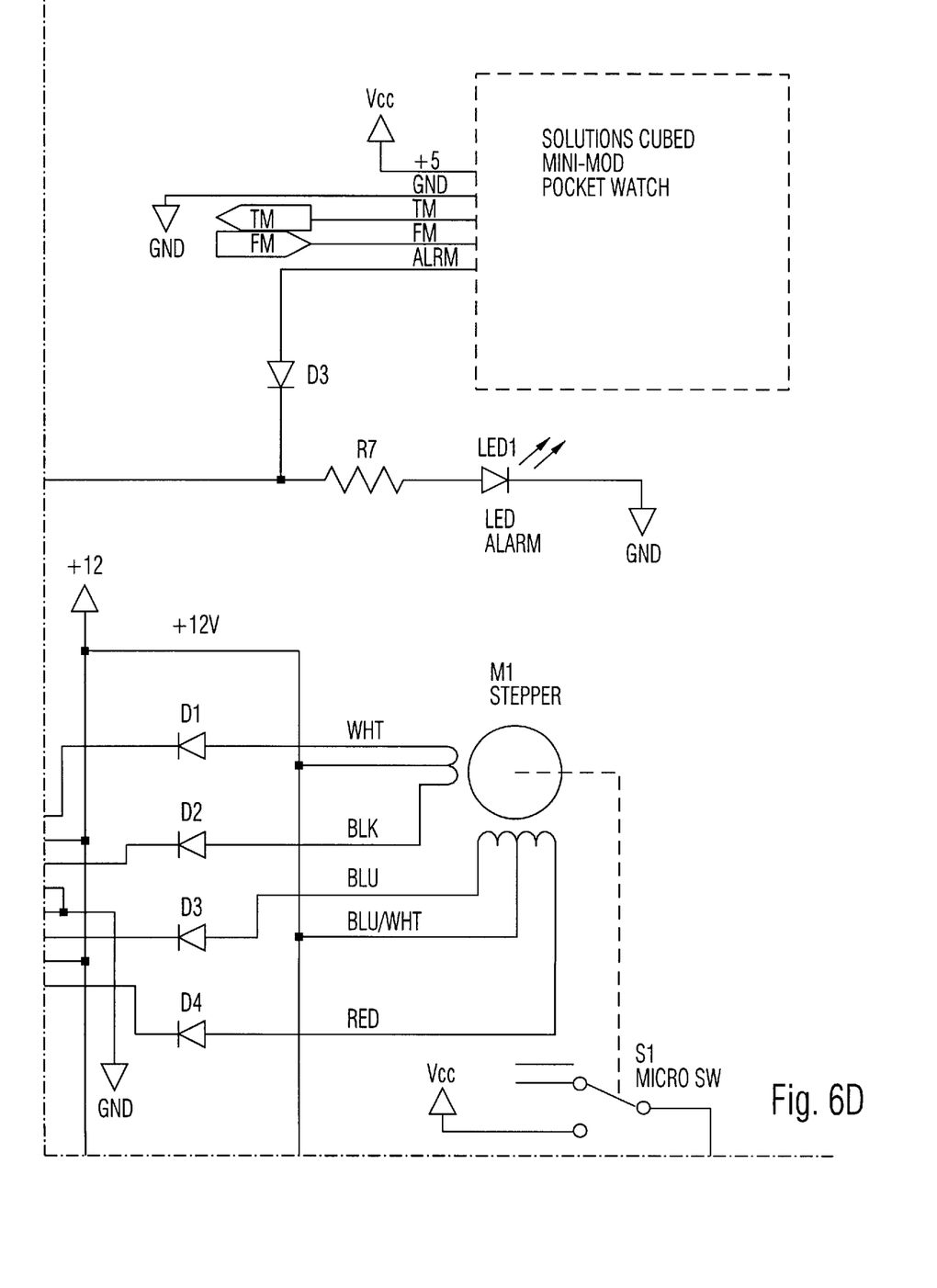
Figure 6E:
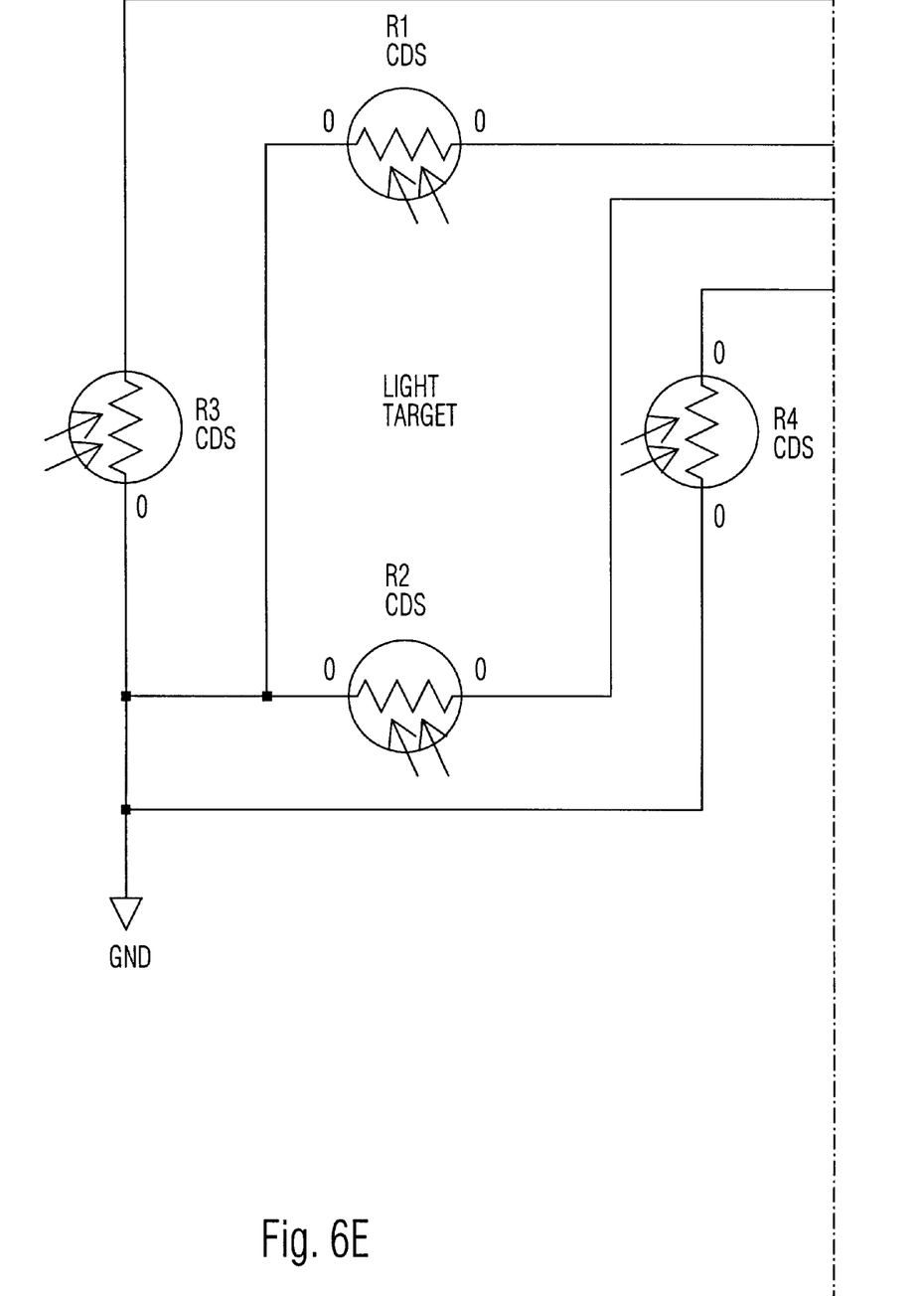
Figure 6F:
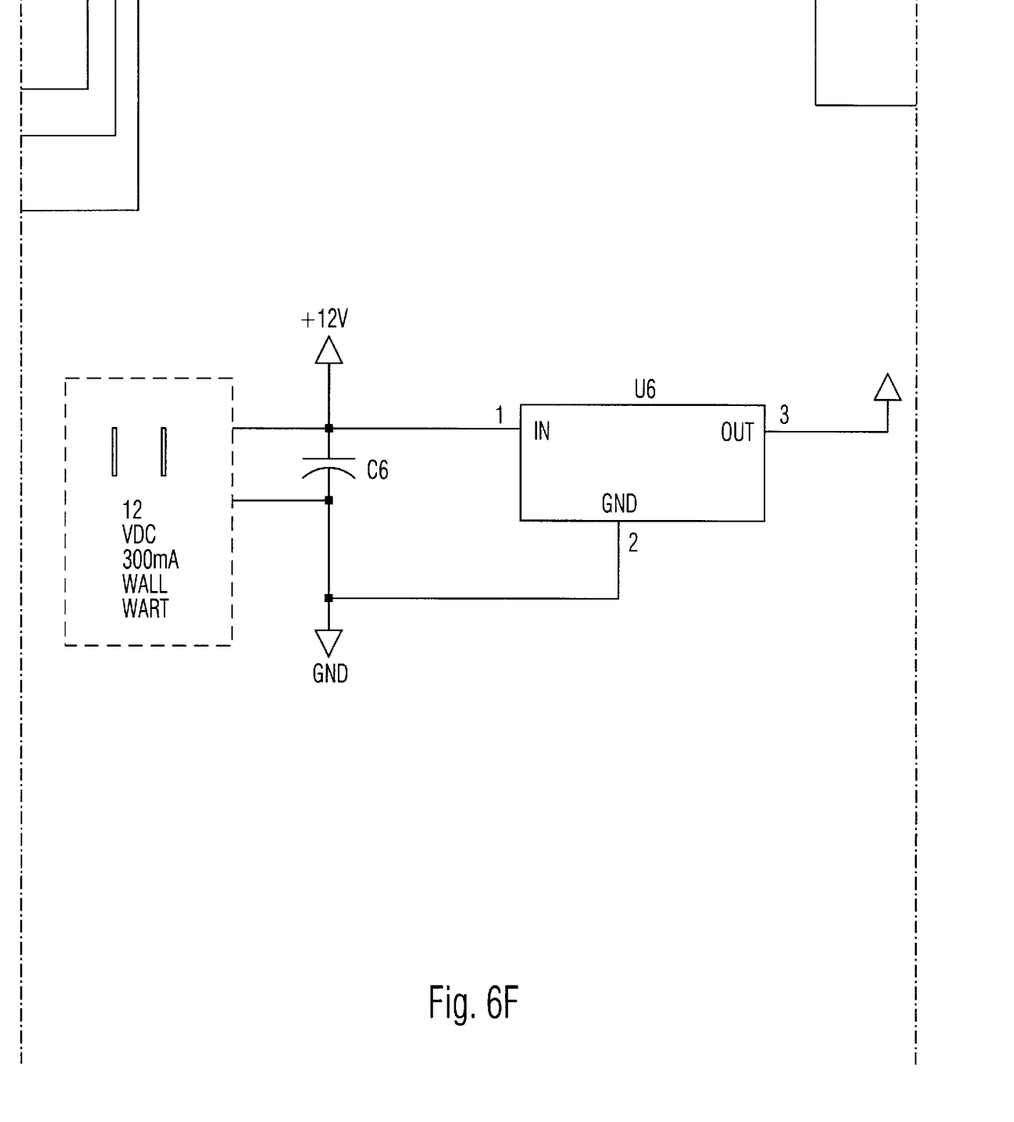
Figure 6G:
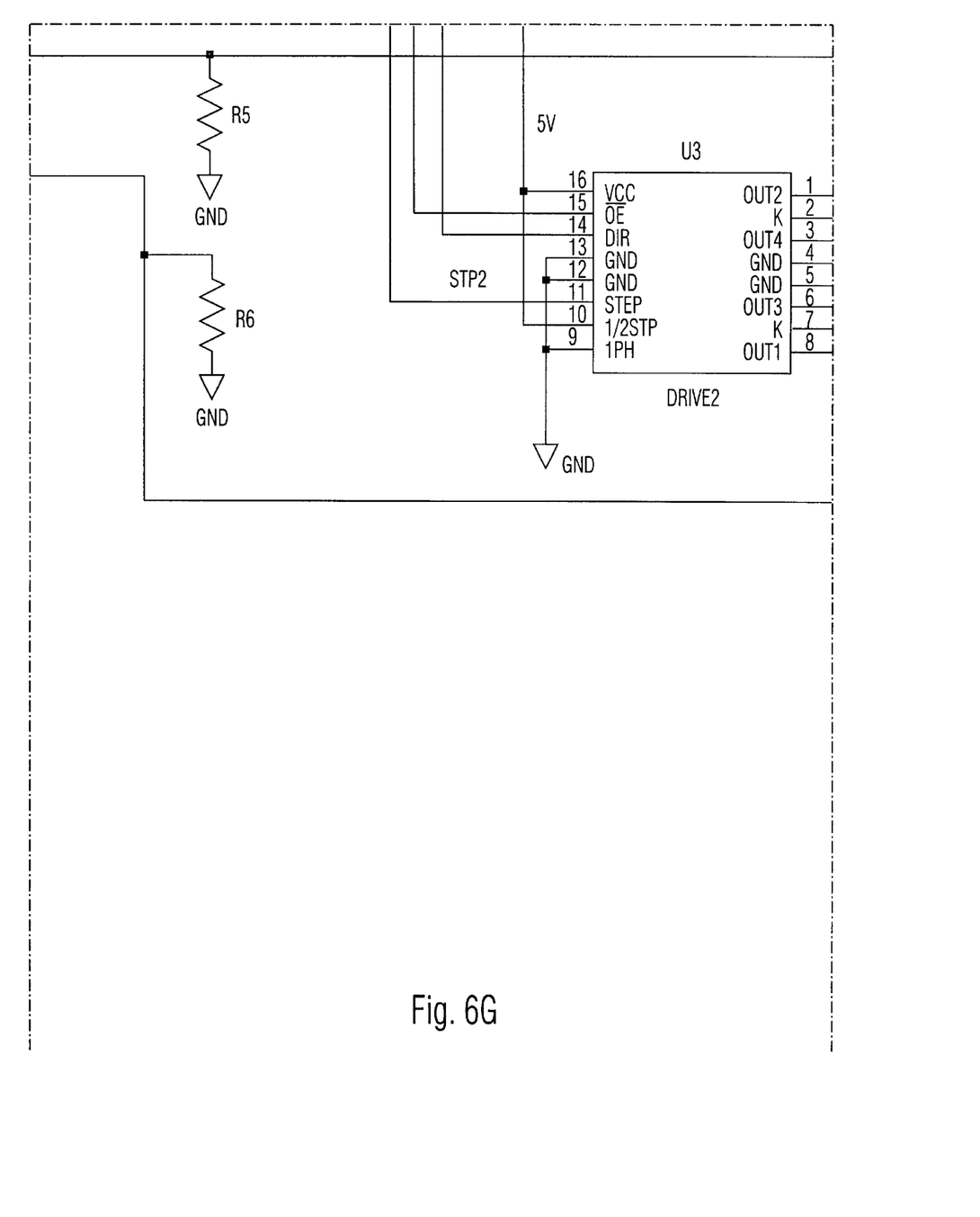
Figure 6H:
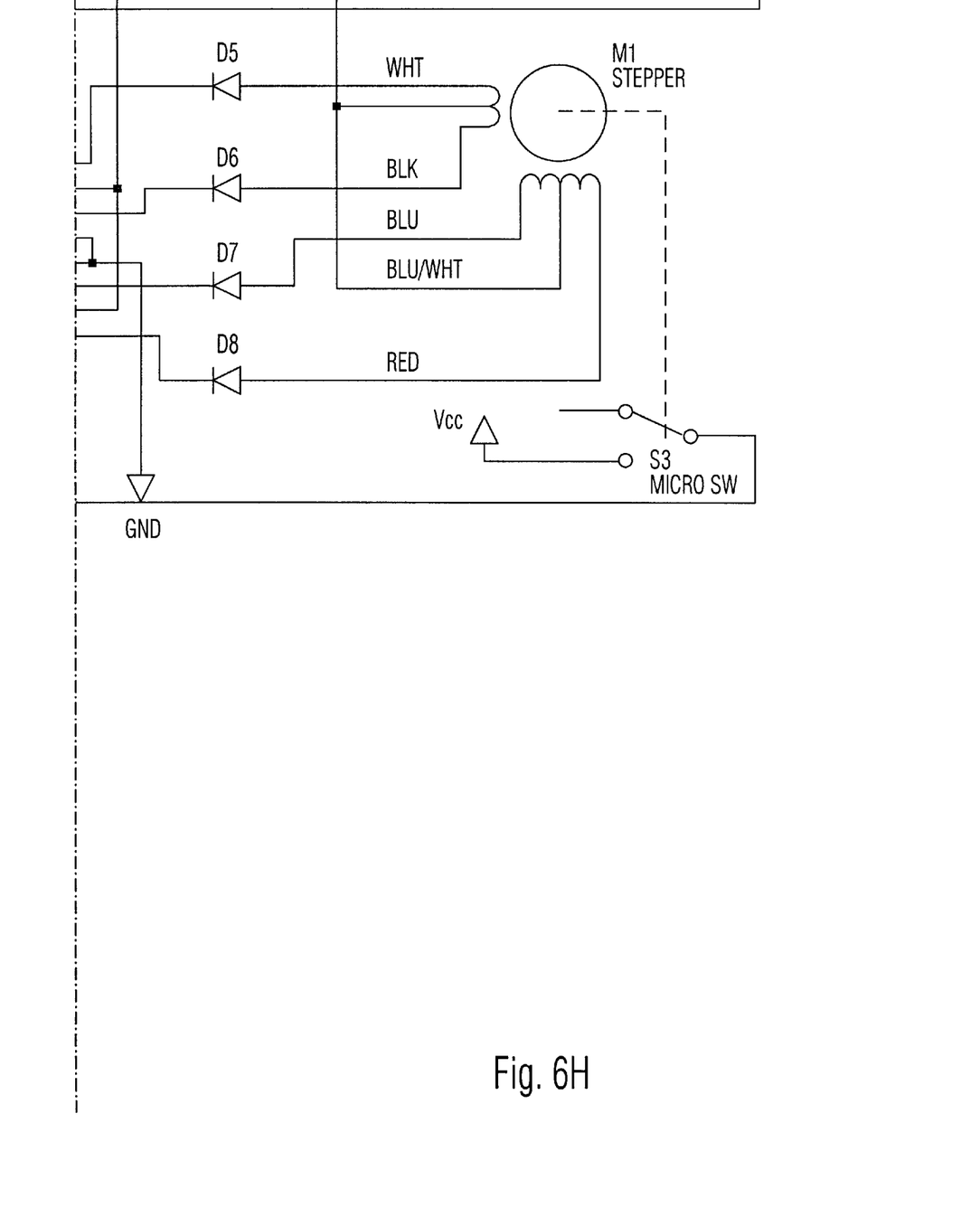

Referring now to FIG. 1, we see the sun reflecting device 2 of the present invention mounted to the exterior of a house window 6 of a house 4. The sun 8 is moving along trajectory 100. The sun's rays 50 strike the mirror 10 of the sun reflecting device 2 and are bounced into the house 4 and appear on the ceiling of the room continuing window 6. FIG. 2 shows an exploded view of the mirror and tracking assembly 2. Main plate 24 is adhered to a window by suction cups 36 and 38. Vertical support 42 and attached bumper 40 provide a third support. The reflecting mirror 10 is attached to platform 24 by post 22 and universal joint 14. Reflecting mirror 10 is also held in place by lead screws 18 and 20 which emanate from stepper motors 26 and 32. Universal joints 16 and 12 attach lead screws 18 and 20 to positions shown 13, 15 on mirror 10. Stepper motors 26 and 32 are allowed to rotate freely because they are mounted within gimbals 30 and 34. Tracking instructions are provided to stepper motors 26 and 32 which in turn adjust the height of lead screws 18 and 20 thereby adjusting the angle of mirror 10. In FIG. 3, we see the sun reflecting device of the present invention 2 mounted to a window 6. Photosensor array 50 is mounted to the inside of window 6. Sunlight 60 strikes tracking mirror 44 which reflects sunlight 60 to photosensor array 50. Tracking mirror 44 can be adjusted because it is on a ball joint 42 so that photosensor array 50 can be placed in any convenient location. Main mirror 10 reflects sunlight 50 through window 6 onto desired location on ceiling. When the Sun 8 moves, the reflected light striking photosensor array 50 moves and photosensors 52 pick up that movement and initiate a change in the height of lead screws 18 and 20, thereby keeping reflected sunlight 50 in a relatively fixed spot on the ceiling. FIG. 4 shows sunlight 50 reflecting off mirror 10 and creating a bright image 70 on ceiling 200. Experiments show that reflected sunlight 50 is so bright that it appears as if there is a skylight in ceiling 200. Control box 60 can manually control position of mirror 10 and is used of initial set up of sun reflecting device 2. FIG. 5 shows a plan view of control box 60. Control box 60 is powered by current coming from a wall outlet and entering line 74 or control box 60 may be powered by batteries. Joystick 62 can be moved in any of four directions 64 which control the angle of mirror 10. When mirror 10 is reflecting sunlight to the desired spot on the ceiling, the user then adjusts small mirror 44 to strike the center of photosensor array 50. The user then presses the reset/restart button 72. Microcomputer in control box 60 then knows that this is where the user wants the reflected sunlight to appear on his or her ceiling. The user then presses the start/tracking button 68. The microcomputer then checks the location of the sunlight on photosensor array 50. It does this approximately once every 10 minutes. As the microcomputer senses changes in the sun's movement, it sends signals to stepper motors 26 and 32 to adjust the mirror 10 angle so that reflected light 50 remains in the spot on the ceiling that the user has selected. The microcontroller remembers the sun tracking activity and when the sun sets, the microcontroller causes lead screws 18 and 20 to reset mirror 10 to a "home position". Mirror 10 is now in a position to catch the rays of the rising sun on the following day. Because the microcontroller remembers the sun's path, it can keep mirror 10 on track even when clouds temporarily obstruct the sun from view. FIG. 6 is a schematic diagram of microcomputer electronics, which accomplish the above discussed actions.

Although the above drawings and description of drawings are a preferred embodiment, there may be other embodiments which fall within the spirit of the present invention and which would be obvious to one versed in the art of sun reflecting devices.

Therefore we claim:

1. A sun reflecting device for providing additional light in a room, comprising:

a mirror and attached sub-mirror, mirror supporting means, a photosensor array, and a microcontroller, said mirror supporting means comprising a centrally located post and two additional posts which are lead screws emanating from stepper motors, said stepper motors being attached to a horizontal platform by gimbal mountings, said horizontal platform being attached to an outside of a window by suction cups, said horizontal platform having a lower vertically oriented brace, an end of said brace contacting the outside of said window or a portion below said window;

said photosensor mounted to the inside of said window, said microcontroller positioned in said room, wherein said sub-mirror reflects light to the photosensor array, said photosensor array senses movement of light reflected from the sub-mirror, and said microcontroller controls adjustment of the stepper motors to move the mirror based at least in part on an output of the photosensor array.

2. A sun reflecting device as claimed in claim 1, wherein said microcontroller is manually controlled by a joystick for optimal positioning of the mirror by a user.

3. A sun reflecting device as claimed in claim 1, wherein said microcontroller automatically tracks said sun's rays and automatically remembers said tracking information.

4. A sunlight reflecting device for reflecting sunlight onto a generally fixed position, comprising:

a mirror support;

a mirror pivotally attached to said mirror support;

a plurality of motors moving said mirror;

a microcontroller connected to said motors;

a photosensor array connected to said microcontroller and positioned at a fixed position separated from said mirror; and    a sub-mirror pivotally attached to said mirror and moved together with said mirror by said motors, said sub-mirror being independently pivotable relative to said mirror for reflecting said sunlight onto said photosensor array;

wherein when said mirror is adjusted to reflect said sunlight onto said generally fixed position, and when said sub-mirror is adjusted to reflect said sunlight onto said photosensor array, movement of said sunlight is sensed by said photosensor array, and said mirror is moved by said motors to reflect said sunlight onto said generally fixed position even when said sunlight is moving, said motors being controlled by said microcontroller based at least in part on an output of said photosensor array.

\* \* \* \* \*